(No Model.)
J. H. WALKER.
Picture Hook.
No. 236,865.  Patented Jan. 18, 1881.
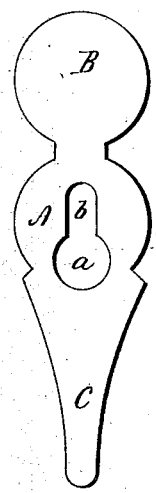
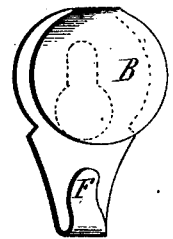
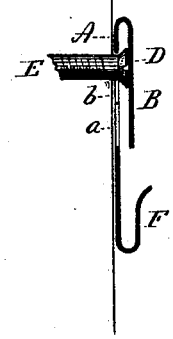
Witnesses.
John H. Walker
Inventor
By atty

UNITED STATES PATENT OFFICE.

JOHN H. WALKER, OF WATERBURY, CONNECTICUT.

PICTURE-HOOK.

SPECIFICATION forming part of Letters Patent No. 236,865, dated January 18, 1881.

Application filed November 30, 1880. (No model.)

*To all whom it may concern:*

Be it known that I, JOHN H. WALKER, of Waterbury, in the county of New Haven and State of Connecticut, have invented a new Improvement in Picture-Nails; and I do hereby declare the following, when taken in connection with the accompanying drawings, and the letters of reference marked thereon, to be a full, clear, and exact description of the same, and which said drawings constitute part of this specification, and represent, in—

Figure 1, a perspective view; Fig. 2, a vertical central section; Fig. 3, the blank from which the hook is made.

This invention relates to an improvement in the article commonly called "picture-hook" or "picture-nail"—that is to say, a device to be attached to the wall from which to suspend a picture, the object of the invention being to make the device in the form of a hook and easily detachable from the device by which it is fastened to the wall; and it consists in the construction as hereinafter described and particularly recited in the claims.

From suitable sheet metal a blank is cut to the form substantially as seen in Fig. 3, the part A of which forms the body, B the covering-head, and C the hook. Yet the outline of these parts may be changed to any desirable shape, to give a more or less ornamental effect.

In the part A a perforation, $a$, is made, large enough to pass over a screw or nail head, with a slot, $b$, extending upward, though less in width than the head of the screw or nail, but so as to pass down onto the body of the screw or nail. The part or cover B is bent down over the part A, and so as to cover the openings in the part A, but distant from the said part A, so as to leave a space for the head D of the screw or nail E. (See Fig. 2.) The lower end C is bent up to form a hook, F, upon which to hang the picture or whatever it may be.

The outside of the part B may be ornamented in any convenient or desirable manner, or may, with good effect, be left plain burnished metal.

Thus constructed the screw or nail is driven into the wall to the required distance, but so as to leave the head projecting, as seen in Fig. 2, then the hook is placed thereon, the perforation $a$ passing over the head and the slot $b$ down onto the body, as seen in Fig. 2.

This construction enables the introduction of the nail or screw before the hook is attached, and from which the hook may be easily removed when occasion requires, and also enables the making of the exposed cover highly ornamental, and avoids difficulties which attend picture-nails in which the head or hook is made a permanent part of the shank or screw.

I claim—

1. The herein-described picture-hook, consisting of the body A, perforated and slotted to pass over the head of a nail or screw and with a cover outside said slot and perforation and a hook below said body, substantially as described.

2. The herein-described picture-hook, consisting of the body A, slotted as described, the cover B, and hook C, all made from a single piece of sheet metal, substantially as described.

JOHN H. WALKER.

Witnesses:
JOHN G. TREAT,
GEO. W. ROBERTS.